United States Patent [19]

Uerdingen et al.

[11] Patent Number: 5,194,334
[45] Date of Patent: Mar. 16, 1993

[54] PROCESS FOR THE PRODUCTION OF SHEET METAL/DUROPLAST COMPOSITE ELEMENTS

[75] Inventors: Walter Uerdingen, Leverkusen; Bert Brassat, Krefeld; Karl-Ludwig Noble, Cologne; Bernhard Hess, Moers; Heino Müller, Leverkusen; Heinz Eichner, Moenchen-Gladbach, all of Fed. Rep. of Germany

[73] Assignee: DSM N.V., Heerlen

[21] Appl. No.: 603,264

[22] Filed: Oct. 25, 1990

Related U.S. Application Data

[63] Continuation of Ser. No. 208,675, Jun. 20, 1988, abandoned.

[30] Foreign Application Priority Data

Jul. 2, 1987 [DE] Fed. Rep. of Germany ....... 3721849

[51] Int. Cl.$^5$ .......................... B32B 15/08; C09J 5/04
[52] U.S. Cl. .................. 428/416; 156/196; 156/245; 156/315; 264/135; 525/31

[56] References Cited

U.S. PATENT DOCUMENTS

| | | | |
|---|---|---|---|
| 2,384,269 | 9/1945 | Bake | 156/315 |
| 3,508,951 | 4/1970 | Shimp et al. | 525/31 |
| 3,551,517 | 12/1970 | Dowbenko et al. | 428/416 |
| 3,844,030 | 10/1974 | Wilkinson | 264/135 |
| 4,673,706 | 6/1987 | Atkins | 525/31 |

FOREIGN PATENT DOCUMENTS

| | | | |
|---|---|---|---|
| 0182642 | 10/1986 | European Pat. Off. | |
| 55-117653 | 9/1980 | Japan | 428/416 |

*Primary Examiner*—John J. Gallagher
*Attorney, Agent, or Firm*—Connolly & Hutz

[57] ABSTRACT

The use of molding compositions based on unsaturated polyester resins containing specific reactive groups and of sheet metals with a specially selected coating results in sheet metal/duroplast composite elements having excellent adhesion.

12 Claims, No Drawings

PROCESS FOR THE PRODUCTION OF SHEET METAL/DUROPLAST COMPOSITE ELEMENTS

This application is continuation of application Ser. No. 07/208,675, filed Jun. 20, 1988, now abandoned.

This invention relates to a process for the production of composite elements of corrosion-proofed sheet metal and molding compositions based on unsaturated polyester resins characterized by excellent adhesion, to composite elements produced by this process and to their use in the construction of motor vehicles, particularly as body parts.

Sheet metal/plastic composite elements combine the advantages of both their constituent materials. The sheetmetal surface is smooth, hard, resistant to deformation, free from sink marks and wavyness and can be painted without difficulty. Its electrical conductivity is desirable in many cases. Advantages of the plastic include inter alia low weight, resistance to corrosion, vibration and noise damping capacity, heat insulation capacity and simple and inexpensive molding, even of complicated shapes.

Accordingly, sheet metal/plastic composite elements are suitable for numerous applications, for example for the production of furniture parts and appliance housings, but especially for use as the outer skin of motor vehicles, cf. FR-P 1 567 839, DE-OS 23 15 161.

In the manufacture of such elements, the sheet metal component and the plastic.-component may be made separately and then bonded to one another. However, the separate forming and handling of the sheet metal component and the plastic component and their subsequent bonding involve several operations which it is desirable to reduce in number for reasons of economy. Possibilities in this direction are described in FR-P 1 296 103 and 2 479 123. In this case, the plastic is directly extruded or molded onto the sheet metal, a firm bond being established either by mechanical anchorage (coating of the sheet metal edges, undercuts) or by primers applied beforehand to the sheet metal. Further rationalization can be obtained by deep drawing the sheet metal and applying the plastic in one and the same mold (EP-A 170 819).

The plastics most suitable for the production of composite elements of the type in question are plastics of which the coefficient of thermal expansion differs very little from that of the sheet metal used in the temperature range through which the elements pass during their production and in their subsequent use. Steel and aluminium sheet have linear expansion coefficients of approximately 11 and approximately $24 \times 10^{-6} K^{-1}$. Non-reinforced plastics have values of from about 60 to $120 \times 10^{-6} K^{-1}$, depending on their structure. Their use in the production of composite elements of the type in question gives rise to a number of disadvantages, including above all deflection in the event of changes in temperature ("bimetal effect") and the gradual loss of adhesion under thermal shock conditions.

Both can render the parts useless.

By contrast, duroplastic parts produced by hardening from highly filled, reinforced molding compositions based on unsaturated polyester resins have coefficients of linear thermal expansion of approximately 10 to $25 \times 10^{-6} K^{-1}$. Accordingly, they can be expected to show more favorable behavior. In addition, unsaturated polyester resins can be modified by addition of so-called low-profile additives in such a way that they can be cured without shrinking so that they are free from internaq stresses, sink marks and wavyness after cooling. Accordingly, the use of molding compositions of this type guarantees the composite elements a particularly good appearance (EP-A 119 131).

Practical tests have now shown that molding compositions based on unsaturated polyester resins of standard composition adhere inadequately to untreated or conventionally pretreated metal sheets after hardening. It does not matter whether the metal sheets are of iron or aluminium or by which of the standard methods, for example zinc phosphating or zinc chromating, they have been pretreated. The same applies even when the metal sheet is coated with a lacquer of standard composition applied by coil coating as protection against corrosion.

Accordingly, it has not hitherto been possible, for the purpose of establishing a sufficiently strong bond between plastic and sheet metal, to manage without measures of the type described above, such as for example the provision of undercuts or the separate application of a primer to the sheet metal. The need for additional measures such as these also represents a significant technical disadvantage because the provision of undercuts limits the structural possibilities available and necessitates additional effort both at the design stage and at the processing stage. The separate application of a primer involves an additional step; resulting tacky surfaces can complicate handling of the sheet metal.

Accordingly, the object of the present invention is to provide composite elements of sheet metal and molding compositions based on unsaturated polyester resins, characterized by good adhesion and also a process for their production which are not attended by any of the disadvantages of the prior art.

It has surprisingly been found that this object can be achieved by the use of certain molding compositions and by the use of sheet metals having a specially adapted coating.

Accordingly, the present invention relates to a process for the production of sheet metal/duroplast composite elements of corrosion-proofed sheet metal and a molding composition based on unsaturated polyester resin, the molding composition being applied to the sheet metal after forming thereof by compression molding and hardening at elevated temperature in one and the same operation (i.e. without either a special intermediate surface treatment or the application of an adhesive) after forming of the sheet metal), characterized in that 1. the unsaturated polyester resin on which the molding composition is based contains polyepoxides in a quantity corresponding to 5 to 200, preferably 15 to 110 and more preferably to 35 to 90 mmol epoxide groups per 100 g of organic binder of the molding composition and/or reaction thereof with α,β-ethylenically unsaturated monoproducts or dicarboxylic acids copolymerizable under the curing conditions, the mono- and dicarboxylic acids having molecular weights below 800, preferably below 500 and more preferably below 300, and 2. the metal sheet is corrosion-proofed by stove lacquering and, on that side to which the polyester resin molding composition is applied, is coated with a primer which contains a) polyepoxides in a quantity corresponding to 5 to 2,00, preferably 10 to 120 and more preferably 10 to 80 mval of epoxide groups per 100 g of the organic binder of this primer and/or b) reaction products of the polyepoxides a) with α,β-ethylenically unsaturated mono- or dicarboxylic acids copolymerizable under the curing conditions, the mono- or dicarboxylic acids having molecular weights below 800, preferably below 500 and more preferably 300, and/or c) 2.5 to 50, preferably 5 to 40 and more preferably 5 to 30% by weight, based on the organic binder of this primer, of unsaturated polyester containing 0.1 to 0.6 and preferably 0.2 to 0.4 equivalent copolymerizable ethylenic double bonds per 100 g unsaturated polyester c).

The present invention also relates to the composite elements produced by this process and to their use in the manufacture of motor vehicles.

The molding composition

Unsaturated polyester resins are mixtures of α,β-ethylenically unsaturated polyesters and monomers copolymerizable therewith which generally contain A. 30 to 80% by weight of unsaturated polyester and
8. 70 to 20% by weight of copolymerizable monomer.

In the context of the invention, α,β-ethylenically unsaturated polyesters A are the usual polycondensates of at least one α,β-ethylenically unsaturated dicarboxylic acid generally containing 4 to 6 carbon atoms or ester-forming derivatives thereof, optionally in admixture with up to 200 mol-%, based on the unsaturated dicarboxylic acid component, of one or more $C_4$-$C_{20}$ dicarboxylic acids which do not contain any radically polymerizable double bonds (or ester-forming derivatives thereof), with at least one polyhydroxyl compound, more especially a dihydroxyl compound, containing 2 to 30 and preferably 2 to 8 carbon atoms, i.e. polyesters of the type described in J. Björksten et al. "Polyesters and their Applications", Reinhold Publishing Corp., N.Y., 1956.

Examples of preferred unsaturated dicarboxylic acids or their derivatives are maleic acid or maleic anhydride and fumaric acid. However, mesaconic acid, citraconic acid, itaconic acid or chloromaleic acid for example may also be used.

Dicarboxylic acids which do not contain any radically polymerizable double bonds may comprise aliphatic, saturated $C_4$-$C_{10}$ dicarboxylic acids, cycloaliphatic and aromatic $C_8$-$C_{10}$ dicarboxylic acids. Preferred dicarboxylic acids which do not contain any radically polymerizable double bonds are phthalic acid, isophthalic acid, terephthalic acid, hexaand tetrahydrophthalic acid, endomethylene tetrahydrophthalic acid, succinic acid, glutaric acid, adipic acid, sebacic acid, hexachloroendomethylene tetrahydrophthalic acid, tetrachlorophthalic acid, hexachloro- and tetrabromophthalic acid. Preferred polyesters contain maleic acid residues of which up to 20 mol-% may be replaced by phthalic acid or isophthalic acid residues. Ester-forming derivatives are understood to include esters (particularly those with low-boiling monohydric alcohols, such as methyl or ethyl alcohol), acid anhydrides and acid halides.

Preferred dihydric alcohols are ethylene glycol, propane-1,2-diol and propane-1,3-diol, diethylene glycol, dipropylene glycol, butane-1,3-diol, butane-1,4-diol, neopentyl glycol, 2-ethylpropane-1,3-diol, hexane-1,6-diol, cycloaliphatic diols, such as perhydrobisphenol A, bisalkoxylated bisphenols, such as for example bisethoxylated bisphenol A.

Ethylene glycol, propane-1,2-diol, diethylene glycol, dipropylene glycol and neopentyl glycol are particularly suitable.

The acid values of the polyesters A may be between 0 and 100 and preferably between 0 and 50, their OH values may their molecular weights determined as number averages $M_n$ may be between about 500 and 5,000 and preferably between about 1,000 and 3,000 (as measured by vapor pressure osmometry in dioxane and acetone; in the event of differing values, the lower value is regarded as the correct value).

Suitable monomers B copolymerizable with the polyesters A are unsaturated compounds preferably bearing α-substituted vinyl groups or β-substituted allyl groups, of the type commonly encountered in polyester technology, more especially unsubstituted styrene itself, but also for example nucleus-chlorinated, -alkylated and -alkenylated styrenes, the alkyl or alkenyl groups containing from 1 to 4 carbon atoms, such as for example vinyl toluene, divinyl benzene, α-methyl styrene, tert.-butyl styrenes, chlorostyrenes, allyl vinyl benzene; vinyl esters of $C_2$-$C_6$ carboxylic acids, preferably vinyl acetate; vinyl pyridine, vinyl naphthalene, vinyl cyclohexane; acrylic acid and methacrylic acid and esters thereof with saturated or unsaturated $C_1$-$C_4$ alcohols, such as methyl, ethyl, butyl, vinyl, allyl, methallyl and vinyl (meth)acrylates, also amides and nitriles of acrylic and methacrylic acid; maleic acid, citraconic acid, mesaconic acid and fumaric acid and semiesters and diesters thereof containing 1 to 4 carbon atoms in the alcohol component, (optionally substituted) semiamides and diamides thereof, also cyclic derivatives of maleic and citraconic acid, such as maleic anhydride, and cyclic imides, such as N-methyl, N-phenyl and N-cyclohexyl maleic imides; allyl compounds, such as allyl benzene, and allyl esters, such as allyl acetate, diallyl phthalate, diallyl isophthalate, diallyl fumarate, diallyl carbonate, triallyl phosphate, triallyl cyanurate. Styrene and nucleus substitution products of styrene are particularly preferred.

In addition to unsaturated polyester resin, the molding compositions may of course also contain low-profile additives of the type described, for example, in DE-PSS 12 41 983, 16 94 657 and 19 53 062. Preferred low-profile additives are, for example, polymers of acrylates and methacrylates, such as polymethyl methacrylate and polyethyl acrylate, homo- and copolymers of vinyl compounds, such as polystyrene and polyvinyl acetate, cellulose esters, such as cellulose acetate propionate and butyrate, the molecular weights being between 10,000 and 10,000,000. Substances of relatively low molecular weight, which are liquid to resin-like at room temperature and, accordingly, are not "thermoplasts" in the accepted sense, but have the character of plasticizers, have also been recommended as low-profile additives (AT-PS 220 369), including for example dibutyl phthalate and polypropylene adipate. Combinations of both groups of compounds have also been described as advantageous (DE-OS 34 26 425).

Low-profile additives are generally used in quantities of from 5 to 25% by weight and preferably in quantities of from 8 to 20% by weight, based on the sum of unsaturated polyester resin and low-profile additive.

In addition to unsaturated polyester resin, the molding compositions may contain up to 400% by weight and preferably from 30 to 200% by weight, based on the sum of unsaturated polyester resin and low-profile additive, of reinforcing material. Suitable reinforcing materials are, in particular, fibrous materials including, for example, inorganic fibers, such as metal, asbestos, carbon and glass fibers, also organic fibers, such as cotton, polyamide, polyester and polyacrylonitrile fibers. Glass fibers, carbon fibers and aramide fibers are preferred.

In addition to unsaturated polyester resin, the molding compositions may contain up to 300% by weight and preferably from 30 to 150% by weight, based on the sum of unsaturated polyester resin and low-profile additive, of (non-reinforcing) fillers, such as for example chalk, talcum, quartz and shale powder, kaolin, calcite, dolomite, mica, heavy spar, kieselguhr, alumina, aluminium oxide hydrate, glass beads or coal dust To protect the unsaturated polyester resin against premature polymerization, the molding compositions may contain polymerization inhibitors in concentrations of 0.001 to 1% by weight and preferably in concentrations of from 0.01 to 0.5% by weight, based on unsaturated polyester resin A + B. Preferred polymerization inhibitors are, for example, monohydric and polyhydric phenols, such as hydroquinone, toluhydroquinone, 4-tert.-butyl pyrocatechol, 2,6-di-tert.-butyl-p-cresol, naphthohydroquinone, also quinones, such as p-benzoquinone, chloranil, naphthoquinone, as well as amines, preferably secondary aryl amines and derivatives thereof, copper salts of organic acids, addition compounds of copper(I) halides with phosphites. These and other preferred inhibitors are described in Houben-Weyl, "Methoden der Organischen Chemie", 4th Edition, Vol. XIV/1, pp 433-453, Georg Thieme Verlag, Stuttgart, 1961.

The molding compositions generally contain 0.1 to 3% by weight and preferably 0.5 to 2% by weight, based on the sum of unsaturated polyester resin and low-profile additive, of radical formers capable of initiating the copolymerization of unsaturated polyester A and monomer B as polymerization initiators. Preferred examples of such radical formers are peroxides, particularly diacyl peroxides, such as dibenzoyl peroxide and di-p-chlorobenzoyl peroxide; peroxy esters, such as tert.-butyl peroxybenzoate, tert.-butyl peroctoate, dicyclohexyl peroxydicarbonate; alkyl peroxides, such as bis-(tert.-butyl peroxy)-butane, dicumyl peroxide, tert.-butyl cumyl peroxide; hydroperoxides, such as cumene hydroperoxide, tert.-butyl hydroperoxide, cyclohexanone hydroperoxide, methyl ethyl ketone hydroperoxide; perketals; ketone peroxides, such as acetyl acetone peroxide.

Other preferred polymerization initiators are peroxide-free compounds which form radicals with cleavage of a C-C-bond, for example benzpinacol silyl ether (described inter alia in Kunststoffe 68 (1978), no. 9, pp 553-555).

Other standard additives for the molding compositions are, for example, pigments, dyes, thickeners, lubricants and release agents, such as zinc stearate, flameproofing agents, UV absorbers and stabilizers against thermal degradation.

According to the invention, the molding compositions contain polyepoxides or reaction products thereof with unsaturated mono- or dicarboxylic acids. Polyepoxides in the context of the invention include aliphatic, cycloaliphatic, aromatic and heterocyclic compounds which contain on average more than 1 1,2-epoxide group and preferably more than 1.5 1,2-epoxide groups per molecule. Preferred polyepoxides have molecular weights below 2,000 (determined as a number average in the case of mixtures of compounds of different molecular weight).

Preferred polyepoxides include polyepoxide compounds, preferably polyglycidyl ethers, based on polyhydric phenols, for example of pyrocatechol, resorcinol, hydroquinone, of 4,4'-dihydroxydiphenyl methane, of 4,4'-dihydroxy-3,3'-dimethyl diphenyl methane, of 4,4'-dihydroxydiphenyl dimethyl methane (bisphenol A), of 4,4'-dihydroxydiphenyl methyl methane, of 4,4'-dihydroxydiphenyl cyclohexane, of 4,4'-dihydroxy-3,3'-dimethyl diphenyl propane, of 4,4'-dihydroxydiphenyl, of 4,4'-dihydroxydiphenyl sulfone, of tris-(4-hydroxyphenyl)-methane, of the chlorination and bromination products of the diphenols mentioned above, particularly of bisphenol A; of novolaks (i.e. reaction products of monohydric or polyhydric phenols with aldehydes, particularly formaldehyde, in the presence of acidic catalysts), of diphenols obtained by esterification of 2 mol of the sodium salt of an aromatic hydroxycarboxylic acid with 1 mol of a dihalogen alkane or dihalogen dialkyl ether (cf. GB-P 1,017,612), of polyphenols obtained by condensation of phenols and long-chain halogen paraffins containing at least two halogen atoms (cf. GB-P 1,024,288).

Other suitable polyepoxides are glycidyl esters of polybasic aromatic, aliphatic and cycloaliphatic carboxylic acids which do not contain any double bonds copolymerizable under the curing conditions, for example phthalic acid di-glycidyl ester, adipic acid diglycidyl ester, hexahydrophthalic acid diglycidyl ester, and glycidyl esters of reaction products of 1 mol of an aromatic or cycloaliphatic dicarboxylic acid anhydride and ½ mol of a diol or 1/n mol of a polyol containing n hydroxyl groups per molecule.

Glycidyl ethers of polyhydric alcohols, for example of 1,4-butanediol, glycerol, trimethylolpropane, pentaerythritol, and of polyethylene glycols may also be used. Compounds containing glycidyl groups attached to heteroatoms, such as N,N'-diglycidyloxamide or bis-glycidyl mercaptomethyl benzene, are also suitable as are glycidyl compounds derived from hydantoins and isocyanuric acid.

Finally, epoxidation products of polyunsaturated compounds are mentioned, including for example epoxidation products of vegetable oils and their conversion products, of diolefins and polyolefins, such as butadiene, vinyl cyclohexene, 1,5,9-cyclododecatriene, and of polymers and copolymers still containing epoxidizable double bonds, for example based on polybutadiene, polyisoprene, butadiene/styrene copolymers. Polymers of unsaturated monoepoxides, for example of methacrylic acid glycidyl ester or allyl glycidyl ether, are also mentioned.

Preferred polyepoxides are bisphenol-A-diglycidyl ether and reaction products of bisphenol-A-diglycidylether with bisphenol A in such a ratio that the reaction product contains on average more than one 1,2-epoxide group per molecule.

Preferred mono- and di-carboxylic acids containing copolymerizable double bonds, of which the reaction products with the polyepoxides may be used in the same way as the polyepoxides themselves, are preferably $C_3$-$C_5$ mono- and $C_4$-$C_6$ dicarboxylic acids, such as for example acrylic acid, methacrylic acid, crotonic acid, vinyl acetic acid, tiglic acid, maleic acid, fumaric acid, citraconic acid, mesaconic acid, itaconic acid and aconitic acid. Acrylic, methacrylic, maleic and fumaric acid are preferred. In reaction products of polyepoxides with dicarboxylic acids, the ratio of epoxide to carboxyl groups in the polyepoxides and dicarboxylic acids is 0.4 to 0.6 and preferably about 1:2.

To prepare the molding compositions, the liquid and soluble components are preferably first mixed using dissolvers, stirrers or the like. Compounding with fillers and reinforcing materials to form prepregs (SMC) or dough-like molding compositions (BMC) has been repeatedly described, for example in Kunststoff-Handbuch, Vol. VIII "Polyester", Edited by R. Vieweg and L. Goerden, Carl-Hanser-Verlag, Munchen 1973, pages 483 et seq. and 491 et seq. The molding compositions are normally stored until the necessary viscosity is reached and are then applied to the metal sheet with forming and curing preferably in heated presses or injection molding machines.

The coated metal sheet 2

The protection of the metal sheets against corrosion consists of a stoving lacquer which, for economic reasons, is preferably applied by coil coating. However, the coating facing the molding composition to be applied may also combine the properties of corrosion prevention and priming in a single layer. In this case, the coatings on both sides of the metal sheet are virtually identical, differing from one another solely in the fact that the coating facing the molding composition to be applied additionally contains components a, b and/or c as defined herein.

However, a process in which the primer coating is applied to the already corrosion-proofed metal sheet is preferred. In this case, the coating facing the molding composition to be applied consists of at least 2 layers. A two-layer coating which consists of the corrosion-inhibiting stoving lacquer as the first layer and of the primer coating as the second layer is particularly preferred. Except for the presence of component a, b, or c, the stoving lacquer layer and the priming layer may contain the same components. However, as shown in the Examples, the stoving lacquer and the priming layer may differ in their other components as well. For a particularly preferred coating, it has proved considerable advantage to select the coating materials for the two successive layers in such a way that they are virtually identical and differ solely in the fact that the second layer additionally contains components a, b and/or c as defined herein.

Since both coating compositions are virtually identical, the coating containing the primer may also be applied in the same way, i.e. preferably by stoving by the coil-coating process.

Suitable binders for the stoving lacquer and the primer layer are those based on alkyd resins, oil-free polyesters, epoxy resins, acrylate resins and preferably on polyurethane resins. As is normally the case for stoving lacquer binders, two-component resins are used, i.e. mixtures of uncrosslinked reactive resins and crosslinking agents which are capable of reacting with the reactive groups of the uncrosslinked resins to form a polymeric network.

The alkyd resins suitable as stoving lacquer binders are preferably products of the type described in (1) H. Wagner, H. F. Sarx, Lackkunstharze, Carl Hanser Verlag. München 1971, pages 86 et seq. and in (2) Ullmanns Encyclopädie der technischen Chemie, 4th Edition, Vol. 15, Verlag Chemie, Weinheim 1978, pages 616 et seq.; suitable oil-free polyesters are preferably products of the type defined in (1), pages 86 et seq and in (2), pages 625 et seq.; suitable epoxy resins are preferably products of the type defined in (1), pages 174 et seq. and in (2), page 637; and suitable acrylate resins are preferably products of the type described in (1), pages 229 et seq and in (2), pages 613 et seq.

Particular preference is attributed to polyurethane lacquers as so-called "one-pot systems" with binders of
I) polyisocyanates containing on average at least 1.8 and preferably at least 2 blocked isocyanate groups per molecule and
II) polymers containing H atoms capable of reacting with isocyanate groups.

Starting materials for the preparation of component I are:

(i) organic polyisocyanates, preferably diisocyanates corresponding to the following formula

in which Q is an aliphatic hydrocarbon radical containing 4 to 12 carbon atoms, a cycloaliphatic hydrocarbon radical containing 6 to 15 carbon atoms, an aromatic hydrocarbon radical containing 6 to 15 carbon atoms or an araliphatic hydrocarbon radical containing 7 to 15 carbon atoms.

Examples of preferred diisocyanates such as these are tetramethylene diisocyanate, hexamethylene diisocyanate, dodecamethylene diisocyanate, 1,4-diisocyanatocyclohexane, 3-isocyanatomethyl-3,5,5-trimethyl cyclohexyl isocyanate ("isophorone diisocyanate"), 4,4'-diisocyanatodicyclohexyl methane, 4,4'-diisocyanatodicyclohexyl-2,2-propane, 1,4-diisocyanatobenzene, 2,4- and 2,6-diisocyanatotoluene or mixtures of these isomers, 4,4'- or 2,4'-diisocyanatodiphenyl methane, 4,4'-diisocyanatodiphenyl-2,2-propane, p-xylylene diisocyanate and $\alpha,\alpha,\alpha',\alpha'$-tetramethyl-m- or -p-xylylene diisocyanate and mixtures containing these compounds.

It is of course also possible to use the polyisocyanates of relatively high functionality known per se in polyurethane chemistry or even modified polyisocyanates known per se, for example polyisocyanates containing carbodiimide groups allophanate groups, isocyanurate groups, urethane groups and/or biuret groups. Examples of higher polyisocyanates such as these are tris-(6-isocyanatohexyl)-biuret, optionally in admixture with its higher homologs, tris-(6-isocyanatohexyl)-isocyanurate, optionally in admixture with its higher homologs, as obtained by trimerization of hexamethylene diisocyanate, for example in accordance with DE-OS 28 39 133, and other known isocyanurate polyisocyanates obtainable by trimerization of aliphatic and/or aromatic diisocyanates, such as for example "isophorone diisocyanate", diisocyantotoluene or hexamethylene diisocyanate. Other suitable polyisocyanates are the urethane polyisocyanates known per se which may be obtained, for example, by reaction of excess quantities of 2,4-diisocyanatotoluene or of "isophorone diisocyanate" with simple polyhydric alcohols having molecular weights of 62 to 300, more especially with trimethylolpropane, and subsequent removal of the unreacted diisocyanate excess by distillation.

Where monofunctional polyisocyanates are used, the quantity in which they are used should preferably be gauged in such a way that the functionality of the resulting blocked polyurethane prepolymers does not fall below the minimum functionality indicated below.

(ii) Polyether and/or polyester polyols of the type known per se in polyurethane chemistry, preferably polyether and polyester diols having molecular weights of 300 to 2,000. The polyethers containing hydroxyl groups which may be used are obtained, for example, by polyaddition of cyclic ethers, such as preferably propylene oxide or even butylene oxide, tetrahydrofuran, styrene oxide and/or epichlorohydrin, on their own, for example in the presence of boron trifluoride, or by addition of these compounds, optionally in admixture or successively, with starter components containing reactive hydrogen atoms, such as alcohols and amines, for example water, ethylene glycol, 1,3- or 1,2-propylene glycol, bisphenol A or aniline.

The polyesters containing hydroxyl groups which may be used are, for example, reaction products of preferably polyhydric, more preferably dihydric and, optionally, also trihydric alcohols with preferably polybasic, more preferably dibasic carboxylic acids. Instead of the free carboxylic acids, it is also possible to use the corresponding carboxylic acid anhydrides or corresponding carboxylic acid esters of lower alcohols for preparing the polyesters.

The alcohols used in the synthesis of the polyesters are, for example, ethylene glycol, 1,2- and 1,3-propylene glycol, butane-1,4-diol, hexane-1,6-diol, neopentyl glycol, octane-1,8-diol, 2-ethylhexane-1,3-diol, 1,4-bishydroxymethyl cyclohexane, diethylene glycol, dipropylene glycol, trimethylolpropane, glycerol and pentaerythritol.

Carboxylic acids which may be used in the synthesis of the polyesters are, for example, adipic acid, succinic acid, suberic acid, azelaic acid, sebacic acid, phthalic acid, isophthalic acid, terephthalic acid, tetrahydrophthalic acid, hexahydrophthalic acid, maleic acid, fumaric acid, saturated and unsaturated fatty acids, such as for example stearic acid, oleic acid, ricinoleic acid, linoleic acid, ricinene acid, linolenic acid, eleostearic acid and fatty acid mixtures obtained from natural oils, such as for example linseed oil, soybean oil, ground nut oil, safflower oil, castor oil or wood oil.

(iii) optionally low molecular weight polyols having molecular weights of 62 to 300. Examples of polyols such as these suitable for use in accordance with the invention are ethanediol, propane-1,2- and -1,3-diol, butane-1,4- and -1,3-diol, pentanediols, hexanediols, octanediols, such as for example 2-ethyl hexane-1,3-diol, trimethylolpropane, glycerol and pentaerythritol.

Representatives of the above-mentioned polyisocyanate and hydroxyl compounds suitable for use in the production of the binders according to the invention are described, for example, in high polymers, Vol. XVI, "Polyurethane Chemistry and Technology", edited by Saunders-Frisch, Interscience Publishers, N.Y., London, Vol. I, 1962, pages 32 to 42 and pages 44 to 54 and Vol. II, 1964, pages 5-6 and 198-199 and in Kunststoff-Handbuch, Vol. VII, edited by Viewegchtlen, Carl Hanser Verlag, MUnchen, 1966, for example on pages 54-71.

(iv) Isocyanate-monofunctional compounds which are suitable for reversibly blocking isocyanate groups, of the type described for example in Z. W. Wicks, Progress in Organic Coatings 9, 3-28 (1981). Examples of blocking agents such as these suitable for the preparation of component (I) of the polyurethane lacquers are lactams, such as caprolactam for example, oximes, such as acetone oxime, methyl ethyl ketone oxime and cyclohexanone oxime, C-H-acid compounds, such as malonic acid esters, acetoacetic acid esters and acetyl acetone, alcohols, such as the simple monoalcohols containing 1 to 4 carbon atoms, 2-ethylhexanol, ethylene glycol monoethyl ether and diethylene glycol monomethyl ether, phenols, such as phenol, cresol and xylenol, and heterocyclic compounds, such as triazoles, imidazolines, imidazoles and tetrahydropyridines.

The blocking agents may be used either individually or in admixture. Preferred blocking agents are c-caprolactam, butanone oxime and malonic acid diethyl ester.

The polyurethane prepolymers (component I) suitable as polyisocyanate I may be prepared by conventional state-of-the-art methods, for example by reaction of polyisocyanates (i) with polyols of relatively high molecular weight (ii) and polyols of low molecular weight (iii), the molar ratio of the isocyanate groups in the polyisocyanate (i) to the hydroxyl groups in the polyols (ii) and (iii) being from 1.5 to 3.0. To block the isocyanate groups, the resulting polyurethane prepolymers containing free isocyanate groups are then reversibly blocked with suitable monofunctional compounds (iv). The synthesis of polyurethane prepolymers (I) is described, for example, in DE-PS 1 644 813.

Component I comprises both reaction products of the polyisocyanates (I) and blocking agents (iv) and blocked polyisocyanate prepolymers based on the above-mentioned compound (i) and (ii) and/or (iii).

The polymers containing isocyanate-reactive H-atoms (component II) are polyester or polyether polyols, polyhydric low molecular weight alcohols, polyamines, polyepoxypolyols, polyhydroxyacrylates or mixtures of these products.

The polyester polyols and polyether polyols are compounds known per se in polyurethane chemistry having molecular weights of 300 to 10,000 and preferably 300 to 5,000. They are preferably formed from the above-described synthesis components (ii) of the polyurethane prepolymers(I). The low molecular weight alcohols are polyalcohols of known type containing at least 2 hydroxy groups per molecule and having molecular weights of 62 to 300.

Suitable polyamines are preferably difunctional or polyfunctional, aliphatic or cycloaliphatic amines, such as 1,2-diaminoethane, tetramethylenediamine, hexamethylenediamine, dodecamethylenediamine, 1,4-diaminocyclohexane, 1,4-bis-aminomethyl cyclohexane, "isophorone" diamine,4,4'-diaminodicyclohexyl methane, 2,2-bis-(4-aminocyclohexyl)propane or m- or p-xylylenediamine. 4,4'-Diamino-3,3'-di-methyl dicyclohexyl methane is particularly preferred.

Components (I) and (II) are preferably used in such quantities that the molar ratio of blocked isocyanate groups to hydroxyl and/or amino groups is 0.5 to 2 and preferably 0.8 to 1.5.

Polyepoxides a) or reaction products thereof b) with α,β-ethylenically unsaturated mono- and dicarboxylic acids are understood to be compounds of the type described in the foregoing as constituents of the moulding compositions. Of these compounds, polyglycidyl ethers based on bisphenol A and addition products thereof with acrylic, methacrylic acid, maleic an fumaric acid are preferred.

According to the invention, polyepoxides known as crosslinkers from lacquer chemistry, such as for example triglycidyl isocyanurate or triglycidyl urazole, may also be used in accordance with the invention.

In the context of definition c), unsaturated polyesters c) are understood to be compounds of the type described in the foregoing as component A of the molding compositions. These unsaturated polyesters c) are preferably used in styrene-free form. Polyesters c) of maleic anhydride, phthalic anhydride and propylene glycol are preferred.

Alternatively, esterification products of α,β-ethylenically unsaturated monocarboxylic acids (preferably containing 3 to 6 carbon atoms) with polyhydroxyl compounds containing at least 2 hydroxyl groups (and preferably 2 to 24 carbon atoms) may also be used as unsaturated polyesters c). It is immaterial whether the molecule is actually built up by the esterification of an unsaturated acid with a polyol or otherwise. Suitable α,β-unsaturated monocarboxylic acids are, for example, acrylic acid, methacrylic acid, crotonic acid, tiglic acid and substitution products thereof. Acrylic and methacrylic acid are preferred. Examples of polyols are aliphatic and cycloaliphatic diols, such as (optionally branched) α,ω-dihydroxyalkanes, polyhydroxyalkanes, perhydrogenated products of polyhydric phenols, such as perhydrobisphenol A; polyalkylene glycols, such as (optionally branched) polyethylene and polypropylene glycols; addition products of alkylene oxides, preferably ethylene or propylene oxide, with polyhydric aromatic or saturated aliphatic carboxylic acids, such as isophthalic acid, trimellitic acid or adipicacid, or with polyhydric phenols, such as bisphenol A. Examples of polyesters falling within this group, of which the molecule is built up purely formally by esterification of an α,β-ethylenically unsaturated monocarboxylic acid with a diol, are the addition products of polyisocyanates and mono(meth)acrylic acid esters of glycols, for example the addition product of 2,4-tolylene diisocyanate and hydroxypropyl methacrylate.

Preferred representatives of the group of alternative polyesters c) have molecular weights of from about 250 to about 2,000. The acrylates and methacrylates of the ethoxylation and propoxylation products of bisphenol A are particularly preferred.

Metal sheets suitable for use in accordance with the invention also include those which consist of two or more layers of different metals of the type mentioned above (same or different thickness). Examples are galvanized steel sheets, bimetallic or sandwich sheets. Sheets provided with inorganic coatings may also be used.

The unsaturated polyesters c) may be dissolved in typical lacquer solvents, such as butyl acetate or gasoline. In addition, the lacquers may contain typical additives, such as fillers, pigments and auxiliaries.

Production of the sheet metal/duroplast composite elements

The composite elements according to the invention are produced by 1. coating the metal with at least one lacquer coating having the composition defined above,
2. forming the coated metal sheet,
3. applying the molding composition to the formed sheet in a heated mold or injection mold.

It is possible to use 0.02 to 2.0 mm, preferably 0.1 to 1 mm and more preferably 0.1 to 0.5 mm thick metal sheets. Sheets of aluminium or steel are preferred, although it is also possible in accordance with the invention to use sheets of noble metals, alloys or other cold-formable metals.

The metal sheets are normally pretreated by conventional methods, for example by passivation, chromating, zinc phosphating or by the application of wash primers in thin layers. Phosphated and passivated steel sheets and chromated aluminium sheets are particularly preferred.

The stoving lacquers corresponding to the above description are preferably applied to the metal sheet by coil coating and, depending on their chemical composition, are stoved at metal temperatures of from 100° C. to 280° C. and preferably in the range from 140° C. to 260° C.

After coating, the metal sheets are formed by standard methods, preferably by deep drawing. However, the process according to the invention may also be applied to metal sheets formed by other methods, for example by rolling.

The molding composition is applied in heated molds of the type typically used in the processing of unsaturated polyester resins, preferably in steel molds, by compression molding or by injection molding at temperatures in the range from 60° C. to 200° C., preferably at temperatures in the range from 80° C. to 180° C. and more preferably at temperatures in the range from 120° C. to 170° C.

EXAMPLES

In the following Examples, percentages are percentages by weight and parts are parts by weight, unless otherwise stated.

The prepregs (SMC) and dough-like molding compositions (BMC) were prepared in the usual way (as described, for example, in Kunststoff-Handbuch Vol. VIII, "Polyester", edited by R. Vieweg and L. Goerden, Carl Hanser Verlag, MUnchen, 1973, pages 482 et seq. and 491 et seq.).

The polyester resin molding composition was applied in a 200 ton press using a 200×300 mm panel mold. 0.3 mm thick sheet metal strips 3 cm wide and approx. 19 cm long were placed in the mold heated to 150° C. and the necessary quantity of molding composition introduced, followed by compression molding for 90 seconds to form a 2 mm thick plate.

The adhesion between the metal and the plastic was determined either by the roller peel test according to DIN 53289 or subjectively. In the latter case, the sheet metal strip was loosened at one corner with a knife and peeled off with pliers. Evaluation was based on a scale of 1 to 5 in which 1 = very strong adhesion; the sheet torn off is at least 50% covered by adhering hardened molding composition; 5 = no adhesion.

Polyester resin molding compositions

Prepregs were made in the usual way (see for example Kunststoff-Handbuch, Vol. VIII "Polyester", edited by R. Vieweg and L. Goerden, Carl Hanser Verlag, MUnchen 1973, pages 482 et seq. and 491 et seq.) from the formulations shown in the Table (quantities in parts by weight). They had a glass fiber content of 25% (staple length 26/26/52 mm). The prepregs were matured by storage at 23° C. and, once moldable, were compression-molded in the manner described above, four pretreated metal strips being placed in the mold (mold temperature 150° C). To evaluate adhesion, eight strips were peeled off by hand. The roller peel test according to DIN 53 289 was optionally carried out on another eight strips to determine peel strength.

|  | SMC 1 | SMC 2 | SMC 3 |
| --- | --- | --- | --- |
| UP resins (see below) | 56.0 | 39.2 | 39.2 |
| LP additive (see below) | 24.0 | 24.0 | 24.0 |

-continued

|  | SMC 1 | SMC 2 | SMC 3 |
|---|---|---|---|
| Diacrylate (see below) | — | 16.8 | — |
| Bisepoxide (see below) | — | — | 16.8 |
| Polyvinyl acetate solution (see below) | 10.0 | 10.0 | 10.0 |
| Styrene | 10.0 | 10.0 | 10.0 |
| Wetting agent | 2.7 | 2.7 | 2.7 |
| Tert.-butyl perbenzoate | 1.4 | 1.4 | 1.4 |
| p-Benzoquinone (10% in styrene) | 0.6 | 0.6 | 0.6 |
| Cobalt naphthenate solution (1% Co) | 1.0 | 1.0 | 1.0 |
| Zinc stearate | 5.0 | 5.0 | 5.0 |
| Chalk | 175 | 175 | 175 |
| MgO paste (35% paste in carrier resin) | 2.9 | 2.9 | 2.9 |

DEFINITIONS USED IN THE TABLES:

UP resin=a 65% solution in styrene of an unsaturated polyester based on maleic anhydride/1,2-propylene glycol. The acid value of the 100% polyester was 20 and the viscosity of the styrene solution 1,600 mPa.sec at 20° C.

LP additive=a 70% solution in styrene of a saturated polyester based on adipic acid/ethylene glycol/1,2-propylene glycol in a molar ratio of 1:0.6:0.4. The acid value of the 100% polyester was 11 and the viscosity of the styrene solution 1,400 mPa.sec at 20° C.;

Diacrylate=an 80% styrene solution of the reaction product of 2 mol methacrylic acid and 1 mol of a commercial epoxy resin based on bisphenol A having an epoxide equivalent according to DIN 16 945 of 185 to 200 (® Lekutherm X 20, a product of Bayer AG);

Bisepoxide=an 80% solution in styrene of the commercial epoxy resin mentioned above;

Polyvinyl acetate solution=a 40% solution in styrene of polyvinyl acetate having an acid value of 3 and a viscosity of 5,000 mPa.sec at 23° C.

The following materials are used in the stoving lacquers and primer compositions shown in the Example.

Component 1
ε-caprolactam-blocked NCO prepolymer based on 2,4- toluylene diisocyanate, a propane-1,2-diol-started propylene oxide polyether having a functionality of 2, an average molecular weight $\overline{M}_n$ of 1,000 and an OH value of 112, trimethylolpropane and diethylene glycol, in the form of a 65% solution in ethylene glycol acetate/xylene (1:1 parts by weight). The content of masked NCO groups was 4.6%.

Component 2
ε-caprolactam-blocked NCO prepolymer based On 2,4-toluylene dIisocyanate, trimethylolpropane, butane-1,3-diol, a bisphenol A-started propylene oxide polyether having a functionality of 2 and an OH value of 200, a polyester based on adipic acid and diethylene glycol having a functionality of 2 and an OH value of 42, in the form of a 70% solution in ethylene glycol acetate/xylene (1:1 parts by weight). The content of masked NCO groups was 16%.

Component 3 (example of component c))
Unsaturated polyester based on maleic anhydride, phthalic acid and propylene glycol having an acid value of 12, in the form of a 75% solution in butyl acetate.

Component 4 (example of component b))
Dimethacrylate of ethoxylated bisphenol A containing 3.8 mval/g ethylenically unsaturated groups.

Component 5 (example of component b))
Diacrylate based on bisphenol A, identical with the styrenefree component of the product described above as Diacrylate, in the form of a 75% solution in butyl acetate.

Component 6 (example of component a))
Commercial epoxy resin as described above as starting product for "diacrylate" (® Lekutherm X 20, a product of Bayer AG), in the form of a 75% solution in butyl acetate.

Hydroxyl-containing polyester I
Polyfunctional hydroxyl-containing polyester based on phthalic anhydride, maleic anhydride, adipic acid, trimethylolpropane and propane-1,2-diol having an average molecular weight $\overline{M}_n$ of 960 and an OH value of 165.

Hydroxyl-containing polyester-polyether mixture II
Mixture of a bisphenol-A-started propylene oxide polyether having a functionality of 2 and an OH value of 200 and a polyester based on adipic acid, isophthalic acid, hexanediol and trimethylolpropane, OH value 400, in the form of a 70% f solution in ethyl glycol acetate/xylene (1:1).

| | Primer Compositions | | | | | |
|---|---|---|---|---|---|---|
| | | | | Comparison | | |
| | P1 | P2 | P3 | P4 | P4 | P6 |
| Polyester/polyether mixture II | 24.7 | 24.7 | 24.7 | 24.7 | 24.7 | 24.7 |
| Component 2 | 33.0 | 33.0 | 33.0 | 33.0 | 33.0 | 33.0 |
| Component 4 | 11.5 | 5.8 | — | — | — | — |
| Component 3 | — | 7.7 | 15.3 | — | — | — |
| Component 5 | — | — | — | 15.3 | — | — |
| Component 6 | — | — | — | — | 15.3 | — |
| Wetting agent | 0.2 | 0.2 | 0.2 | 0.2 | 0.2 | 0.2 |
| Silica gel | 0.6 | 0.6 | 0.6 | 0.6 | 0.6 | 0.6 |
| Titanium dioxide | 7.3 | 7.3 | 7.3 | 7.3 | 7.3 | 7.3 |
| Magnetite | 0.4 | 0.4 | 0.4 | 0.4 | 0.4 | 0.4 |
| Carbon black | 0.1 | 0.1 | 0.1 | 0.1 | 0.1 | 0.1 |
| Ethyl glycol acetate | 4.0 | 4.0 | 4.0 | 4.0 | 4.0 | 4.0 |
| Butyl acetate | 0.7 | 0.7 | 0.7 | 0.7 | 0.7 | 0.7 |
| Xylene | 4.5 | 2.5 | 0.7 | 0.7 | 0.7 | 0.7 |

The resins, pigments and additives (quantities in parts by weight) were made into a paste in the usual way. The lacquers were adjusted by dilution with solvent (solvent naphtha 200) to a viscosity corresponding to a flow out time of 100 seconds (DIN 53 211, DIN-4-cup).

| Stoving Laquers | | | |
|---|---|---|---|
| | SL1 | SL2 | SL3 |
| Component 1 | 33.5 | 34.4 | 31.9 |
| OH-containing polyester I | 12.0 | 12.1 | 11.4 |
| 4,4'-diamino-3,3'-dimethyl dicyclohexyl methane | — | — | 4.8 |
| Wetting agent, 10% in solvent aphtha 100 | — | — | 1.3 |
| Bentonite, 10% in solvent naphtha 100/ Antiterra U (85:5) | 3.4 | 3.5 | 3.2 |
| Zinc chromate | 15.2 | 15.6 | — |
| Microtalcum | 13.1 | — | 12.9 |
| Blanc Fixe Micro | — | 12.1 | — |
| Blanc Fixe F | — | — | 14.5 |
| Iron oxide black | — | — | 3.2 |
| Titanium dioxide | 13.5 | 3.5 | — |
| Carbon black | 1.7 | — | — |
| Polyester-based foam inhibitor | 2.2 | 0.4 | — |
| Solvent naphtha 200 | 15.1 | 18.2 | — |
| Dilution with SN 200 to application viscosity (DIN-4-cup) | 70 sec | 100 sec | 70 sec |
| Layer thickness in μm (dry film) approx. | 20 | 5 | 10 |

Metal sheets
All the tests described here were carried out with 0.3 mm thick metal sheets. The following types were used:
S1: untreated and degreased steel S2 : galvanized steel
S3 : zinc-phosphated steel
S4 : passivated steel
S5 : galvanized, passivated steel
A11: chromated aluminium and
A12: untreated aluminium.

Production of the lacquered metal sheets

The anti-corrosion stoving lacquer was applied to the variously pretreated metal sheets, aired for 10 minutes and then stoved (peak metal temperature 241° C.). The primer composition was then applied and stoved after airing for 10 minutes (peak metal temperature 241° C.).

The composition of the coil coating lacquer layers is shown in the following Table.

| | Composition of the laquer coatings | | | | | | | | | | | | | |
|---|---|---|---|---|---|---|---|---|---|---|---|---|---|---|
| | A | B | C | D | E | F | G | H | I | K | L | M | N | O |
| Metal sheet | S1 | S2 | S3 | S4 | S4 | AL | S1 | S5 | S5 | S5 | S5 | S5 | AL1 | AL2 |
| Stoving Lacquer | — | SL3 | SL2 | SL2 | SL2 | SL2 | SL3 | SL2 | SL2 | SL2 | SL2 | SL2 | SL2 | SL |
| Layer thickness (μm) | — | 10 | 5 | 5 | 5 | 5 | 5 | 5 | 5 | 5 | 5 | 5 | 5 | 5 |
| Primer Composition | — | — | P1 | P2 | P3 | P3 | P1 | P6 | P5 | P4 | P3 | P2 | P5 | P2 |
| Layer thickness (μm) | — | — | 20 | 20 | 20 | 20 | 20 | 20 | 20 | 20 | 20 | 20 | 20 | 20 |
| Stoving Lacquer, back | — | — | SL1 | SL1 | SL1 | SL1 | SL1 | SL1 | SL1 | SL1 | SL1 | SL1 | SL1 | |
| Layer thickness (μm) | — | — | 20 | 20 | 20 | 20 | 20 | 20 | 20 | 20 | 20 | 20 | 20 | — |

Measurements on coated metal sheets:

SMC molding compositions were applied as described above to the prepared sheet metal strips. The following Examples show the results of the adhesion tests.

EXAMPLE 1 to 9 (Comparison Examples)

SMC 1 was used for coating.

| Test no. | Pretreated metal | Adhesion (hand test) |
|---|---|---|
| 1 | A | 5 |
| 2 | B | 5 |
| 3 | C | 5 |
| 4 | E | 4–5 |
| 5 | G | 5 |
| 6 | F | 4–5 |
| 7 | H | 5 |
| 8 | I | 4 |
| 9 | O | 5 |

EXAMPLES 10 to 21

SMC 2 was used for coating.

| Test no. | Pretreated metal | Adhesion (hand test) | Peel strength (N/mm²) |
|---|---|---|---|
| 10 (Comp.) | A | 5 | n.m.(1) |
| 11 | D | 2 | n.g.(2) |
| 12 | E | 2–3 | n.g. |
| 13 | F | 2–3 | 0.51 |
| 14 | G | 2 | 1.20 |
| 15 (Comp.) | H | 4–5 | n.m. |
| 16 | I | 1 | 1.57 |
| 17 | K | 1–2 | 1.29 |
| 18 | L | 2–3 | 0.58 |
| 19 | M | 2 | n.g. |
| 20 | N | 2 | 0.84 |
| 21 (Comp.) | O | 5 | n.m.(1) | n.m.(1) not measurable (metal strip becomes detached when lifted off the coating at a corner).
n.g.(2) not measured.

EXAMPLES 22 to 31

SMC 3 was used for coating.

| Test no. | Pretreated metal | Adhesion (hand test) | Peel strength (N/mm²) |
|---|---|---|---|
| 22 (Comp.) | A | 5 | n.m.(1) |
| 23 (Comp.) | B | 4 | n.g.(1) |
| 24 | D | 2 | n.g. |
| 25 | E | 2–3 | 0.58 |
| 26 | F | 2–3 | 1.03 |
| 27 | G | 1–2 | 0.99 |
| 28 (Comp.) | H | 4 | 0.24 |
| 29 | I | 1 | 1.29 |
| 30 | K | 1 | 1.65 |
| 31 | N | 2–3 | 0.60 |

(1) see note
(1) under Examples 10–21

What is claimed is:

1. A process for the production of sheet metal/duroplast composites comprising corrosion-proofed sheet metal and a molding composition applied to the sheet metal after forming thereof by compression molding and curing at elevated temperature is a single operation wherein said molding composition comprises an unsaturated polyester resin and: i) polyepoxides in a quantity corresponding to 5–200 mmol epoxide groups per 100 g organic binder of the molding composition; ii) reaction products of said polyepoxides with alpha, beta-ethylenically unsaturated mono- or dicarboxylic acids copolymerizable under the curing conditions, the mono- or dicarboxylic acids having molecule weights below 800; or iii) mixtures of polyepoxides and said production products and said metal sheet is pre-treated with a stoving lacquer based on a binder component composed of alkyl resins, oil-free polyesters, epoxy resins, acrylate resins, or polyurethane resins and the stoving lacquer is further coated on the side to which the polyester resin molding composition is applied with a primer composition based on a binder component composed of alkyl resins, oil-free polyesters, epoxy resins, acrylate resins, or polyurethane resins and additionally containing at least one of the following:

a) polyepoxides in a quantity of 5–200 mval epoxide groups per 100 g organic binder of said primer composition and/or b) reaction products of the polyepoxides a) with alpha, beta-ethylenically unsaturated mono- or dicarboxylic acids copolymerizable under hardening conditions, the mono- or dicarboxylic acids having molecular weights below 800, and /or c) 2.5–50% by weight, based on the organic binder of said primer composition of unsaturated polyester containing 0.1–0.6 equivalents of copolymerizable ethylenic double bonds per 100 g of unsaturated polyester c), or mixtures a), b) and c) wherein the binder components of the stoving lacquer and the primer composition are selected such that the binder component of the stoving lacquer differs from the binder component of the primer composition and wherein the stoving lacquer does not contain a), b) or c).

2. A process as claimed in claim 1, characterized in that the quantity of polyepoxide for the unsaturated polyester resin of said molding composition corresponds to a quantity of 15 to 110 mmol epoxide groups per 100 g organic binder of said molding composition.

3. A process as claimed in claim 1, characterized in that the quantity of polyepoxide for the unsaturated polyester resin of said molding composition corresponds to a quantity of 35 to 90 mmol epoxide groups per 100 g organic binder of said molding composition.

4. A process as claimed in claim 1, characterized in that the primer composition contains component a) and the quantity of polyepoxide in the primer composition corresponds to a quantity of 10 to 120 mval epoxide groups per 100 g of organic binder of said primer composition.

5. A process as claimed in claim 4, characterized in that the quantity of polyepoxide in said primer composition corresponds to a quantity of 10 to 80 mval epoxide groups per 100 g of said primer composition.

6. A process as claimed in claim 1, characterized in that the primer composition contains component c) and component c) is present in a quantity of 5 to 40% by weight.

7. A process as claimed in claim 6, characterized in that component c) is present in a quantity of 5 to 30% by weight.

8. A process as claimed in claim 1, characterized in that the primer composition contains component c) and component c) contains 0.2 to 0.4 equivalents of copolymerizable ethylenic double bonds per 100 g of component c).

9. Composite elements produced by the process claimed in claim 1.

10. A motor vehicle comprising the composite element of claim 9.

11. A process according to claim 1, wherein the stoving lacquer is stored before application of the primer composition.

12. A process according to claim 11, wherein the primer composition is stored before application of the molding composition.

* * * * *

UNITED STATES PATENT AND TRADEMARK OFFICE
CERTIFICATE OF CORRECTION

PATENT NO. : 5,194,334
DATED : March 16, 1993
INVENTOR(S) : Uerdingen, et al.

It is certified that error appears in the above-indentified patent and that said Letters Patent is hereby corrected as shown below:

At Col. 16, line 33 "is" should read: --in--.

At Col. 16, lines 45 and 53, the word "alkyl" should read: --alkyd--.

At Col. 18, lines 21 and 24, the word "stored" should read: --stoved--.

Signed and Sealed this

Twenty-sixth Day of July, 1994

Attest:

BRUCE LEHMAN

Attesting Officer          Commissioner of Patents and Trademarks